(12) United States Patent
Romano

(10) Patent No.: US 6,409,107 B1
(45) Date of Patent: Jun. 25, 2002

(54) HAND-HELD FOOD PROCESSOR

(76) Inventor: John J. Romano, 240 W. Third Ave., Conshohocken, PA (US) 19428

( * ) Notice: Subject to any disclaimer, the term of this patent is extended or adjusted under 35 U.S.C. 154(b) by 0 days.

(21) Appl. No.: 09/690,175

(22) Filed: Oct. 17, 2000

(51) Int. Cl.[7] ................................................. A47J 43/25
(52) U.S. Cl. ........................................ 241/94; 241/168
(58) Field of Search ........................... 241/273.1, 273.2, 241/168, 169, 94

(56) References Cited

U.S. PATENT DOCUMENTS

| | | | |
|---|---|---|---|
| 67,010 A | 7/1867 | Whitney et al. | |
| 125,428 A | 4/1872 | Amerling | |
| 186,884 A | 1/1877 | Scheibel | |
| 602,628 A | * 4/1898 | Powell | 241/74 |
| 637,521 A | 11/1899 | Mitchel | |
| 774,217 A | 11/1904 | Welke | |
| 3,195,598 A | 7/1965 | Koch | |
| 5,101,720 A | 4/1992 | Bianchi | |
| 5,312,054 A | 5/1994 | Feer et al. | |
| 5,711,491 A | 1/1998 | Molo | |
| 6,026,985 A | 2/2000 | Elliott, Sr. | |

* cited by examiner

*Primary Examiner*—Mark Rosenbaum
(74) *Attorney, Agent, or Firm*—Caesar, Rivise, Bernstein, Cohen & Pokotilow, Ltd.

(57) ABSTRACT

A food processor device arranged to be held in a user's hand for slicing or grating a foodstuff, e.g., garlic, is provided. The device basically comprises a receptacle member having a "handle-like" portion with a hollow cavity at one end for receipt of the foodstuff. An elongated, "handle-like" pusher member is pivotably connected to the opposite end of the receptacle member and is arranged to be pressed down by the user squeezing on the device for pushing the foodstuff toward an outlet of the cavity. A cutting member is provided for slicing or grating the foodstuff and is releasably mounted immediately adjacent the receptacle's outlet. The cutting member is arranged to be pulled across the receptacle's out by an actuator lever mounted on the handle-like portion of the receptacle member. The cutting member is a planar panel having at least one a slicing blade offset parallel slightly therefrom on one side of the planar panel, and at least one grating blade offset at angle to the panel on the opposite side as the slicing blade. The cutting member is arranged to be releasably mounted on the device adjacent the cavity's outlet with either the slicing blade(s) or grating blades(s) oriented toward the outlet to slice or grate the foodstuff, as the case may be. The cutter member cuts or grates the portion of the foodstuff forced out of the outlet as the blade is drawn across the outlet by squeezing the actuator lever. The actuator lever is spring-biased to enable the cutter blade to automatically return to a neutral or extended position with respect to the outlet upon release of the actuator lever. The pusher member includes an offset end arranged to enter into the cavity and that end has a textured surface to engage the foodstuff and prevent it from slipping on its way to the outlet.

17 Claims, 5 Drawing Sheets

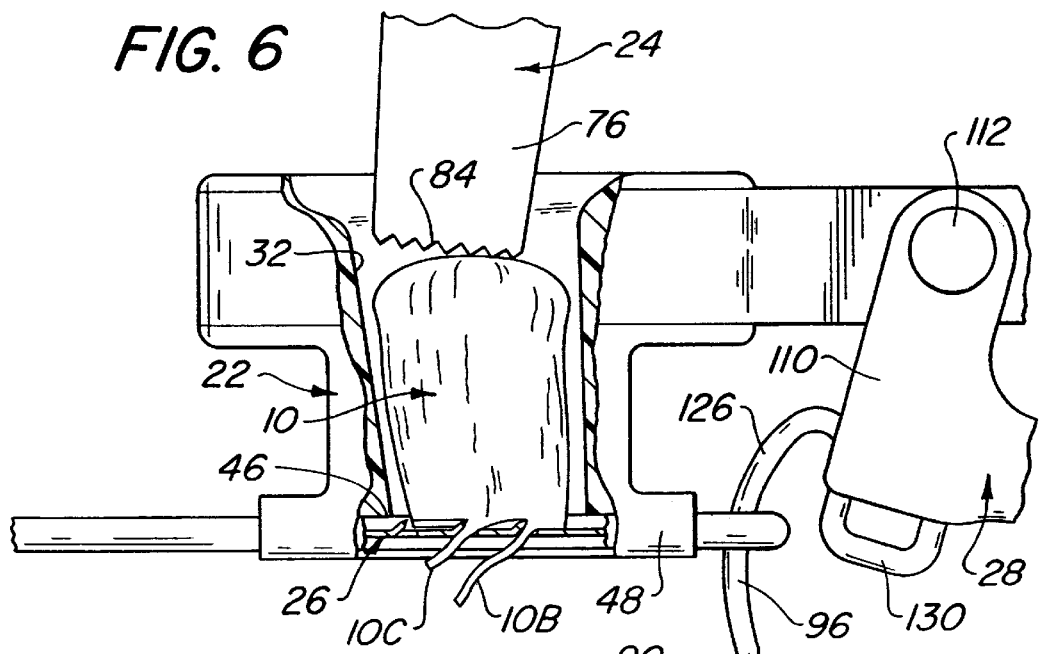
FIG. 6
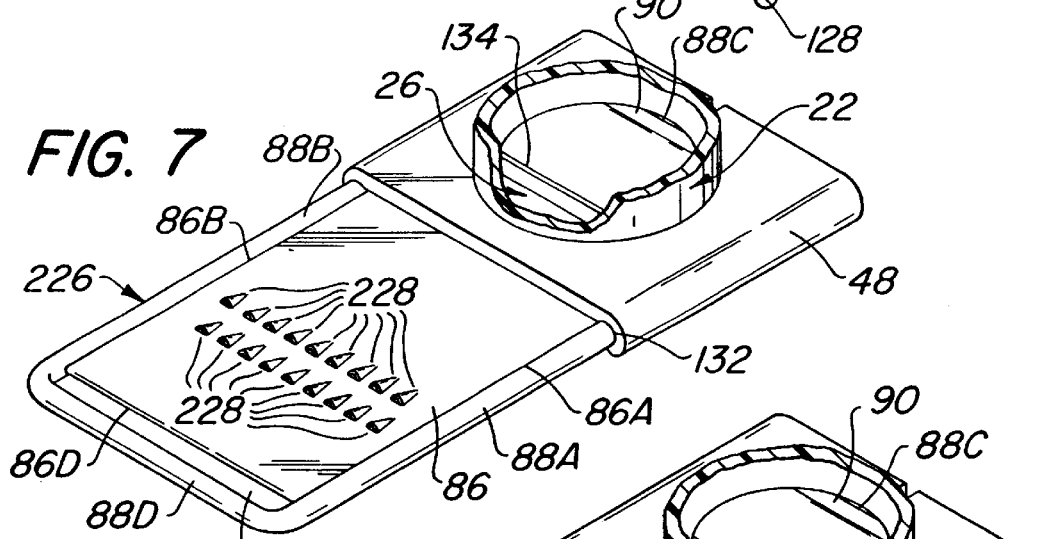
FIG. 7
FIG. 8

HAND-HELD FOOD PROCESSOR

BACKGROUND OF THE INVENTION

This invention relates generally to food processing devices, and in particular to a hand-held device for slicing or grating foodstuffs.

The patent literature includes numerous patents disclosing hand-held devices for processing foodstuffs.

For example, U.S. Pat. No. 125,428 (Amerling) discloses a nutmeg grater in the form of a wooden body having a circular opening. In this device, the nutmeg is placed in position within the circular opening and the operator presses his thumb down on a rod holding a follower member. Thereafter, using the unoccupied hand, the operator revolves a crank which rotates a grater to grinds or grate the nutmeg.

U.S. Pat. No. 67,010 (Whitney et al) also discloses a nutmeg grater. The grater of this patent comprises a circular grating disk that is disposed beneath a device for yieldingly retaining the nutmeg in contact with the grating disk. In operation, the nutmeg is placed in the pocket or receptacle of the device in contact with the grating-disk. A piston is provided which may be withdrawn or turned to one side to allow for insertion of the nutmeg. The device includes a follower to press the nut with the desired force against the grating-disk which is rotated by means of the crank.

U.S. Pat. No. 186,884 (Scheibel) also discloses a hand-held nutmeg press having a revolving grating disk on which nuts are pressed by means of a receptacle having a spring-loaded follower.

U.S. Pat. No. 673,521 (Mitchel) discloses a kitchen utensil arranged to be mounted on a table or the like for slicing and grating potatoes that includes a hollow case in which the potato is disposed. The hollow case has an open discharge end and a piston that is reciprocable within the case to push the potato toward the discharge end. The utensil also includes a material-separating or grater disk that is revolvably mounted on an arbor and a rotatable hand crank that is rotatable to slice or grate the potato as it is pushed out of the discharge end of the utensil.

U.S. Pat. No. 774,217 (Welke) discloses a nutmeg grater that is comprised of two radial operating arms that are pivotally connected together at one end by a retaining bolt. A spring interposed between the operating arms biases the arms away from each other. A receptacle is rigidly connected at one end of one of the operating arms and a grater plate is rigidly connected to the free end of the opposite arm. A means is provided for yieldingly retaining nutmeg in contact with the grater plate. As the free ends of the arms are compressed and released, the grater plate is moved in a circular course beneath the receptacle to grate the nutmeg.

U.S. Pat. No. 3,195,598 (Koch) discloses a device for grating fruits or vegetables.

U.S. Pat. No. 5,101,720 (Bianchi) discloses a double-hinged garlic press/grater combination which can press, extrude and grate material.

U.S. Pat. No. 5,312,054 (Feer et al) discloses a food grater comprising an inverted V-shaped freestanding frame defined by first and second panel members pivotally joined at upper ends. The panels fold into a parallel orientation for storage and expand into a freestanding orientation for use. Outwardly directed food grating means 22 in at least one of the panels is provided to grate food passed thereover, and apertures 20 communicate with the grating means to pass grated food segments to an inside surface of the panel. A transparent collection container 44 attaches to the inside surface of the panel and serves to collect the fragmented food and display its quantity to the user.

U.S. Pat. No. 5,711,491 (Molo) discloses a food grater including a grater blade removably mounted to a forward face of an upwardly and rearwardly inclined housing positioned for the reception of the grated foodstuff. The housing has a handle pivotally secured to the rear thereof and movable between an open rearwardly and downwardly inclined position bracing the housing, and a forward folded position partially nested within the rear portion of the housing, presumably for storage.

U.S. Pat. No. 6,026,985 (Elliott, Sr.) discloses a food dispenser gun comprising a tube holding a quantity of an extrudable food product, a piston sealingly engaged with an interior of the tube, a rod coupled to the piston and an incremental dispenser engaged with the rod and the tube, the incremental dispenser comprising a trigger, or an advancement lever operable to move the rod in a first direction relative to the incremental dispenser in response to the trigger and a retrograde lock operable to prevent the rod from moving in a second direction.

While all of the aforementioned prior art may be suitable for their general purposes they still leave much to be desired from various standpoints, such as hand-holdability, ease of use, effectiveness, simplicity of construction, etc.

SUMMARY OF THE INVENTION

In accordance with one aspect of this invention there is provided a hand-held food processor for slicing or grating a foodstuff, e.g., garlic. The food processor basically comprises a receptacle member having a hollow cavity for receipt of the food stuff, a pusher member for engaging the foodstuff to move the foodstuff, a cutting member for slicing or grating the foodstuff and an actuator for operating the cutting member. The receptacle member has a body portion, e.g., an elongated handle-like member, including a first end and a second end. The hollow cavity is located at the second end of the receptacle member and has a outlet through which a portion of the foodstuff is arranged to be pushed.

The cutting member, e.g., a planar panel having at least one opening whose marginal edge forms a blade or grating element, is movably mounted, e.g., arranged for reciprocation, adjacent the receptacle's outlet. The pusher member, e.g., an elongated handle-like member, has a first end pivotably connected to the first end of the receptacle member and a second end, e.g., a textured surface, for engaging the foodstuff within the cavity to push a portion of the foodstuff out of the outlet.

The actuator, e.g., a spring-biased lever, is arranged to cause the cutting member to move, e.g., reciprocate, across the outlet into engagement with the portion of the foodstuff exiting the outlet to slice or grate that portion of the foodstuff.

DESCRIPTION OF THE DRAWING

FIG. 6 is a partial sectional view similar to FIG. 5, with the cutting member mounted thereon in an orientation effecting the grating of plural pieces of the foodstuff;

FIG. 7 is an isometric view of an alternative embodiment of a cutting member for the food processor device for grating food stuffs into small pieces; and FIG. 8 is an isometric view similar to FIG. 7 but showing another embodiment of a cutting member of the food processor device for grating food stuffs into julienne type strips.

DETAILED DESCRIPTION OF THE PREFERRED EMBODIMENT

Figure 1:
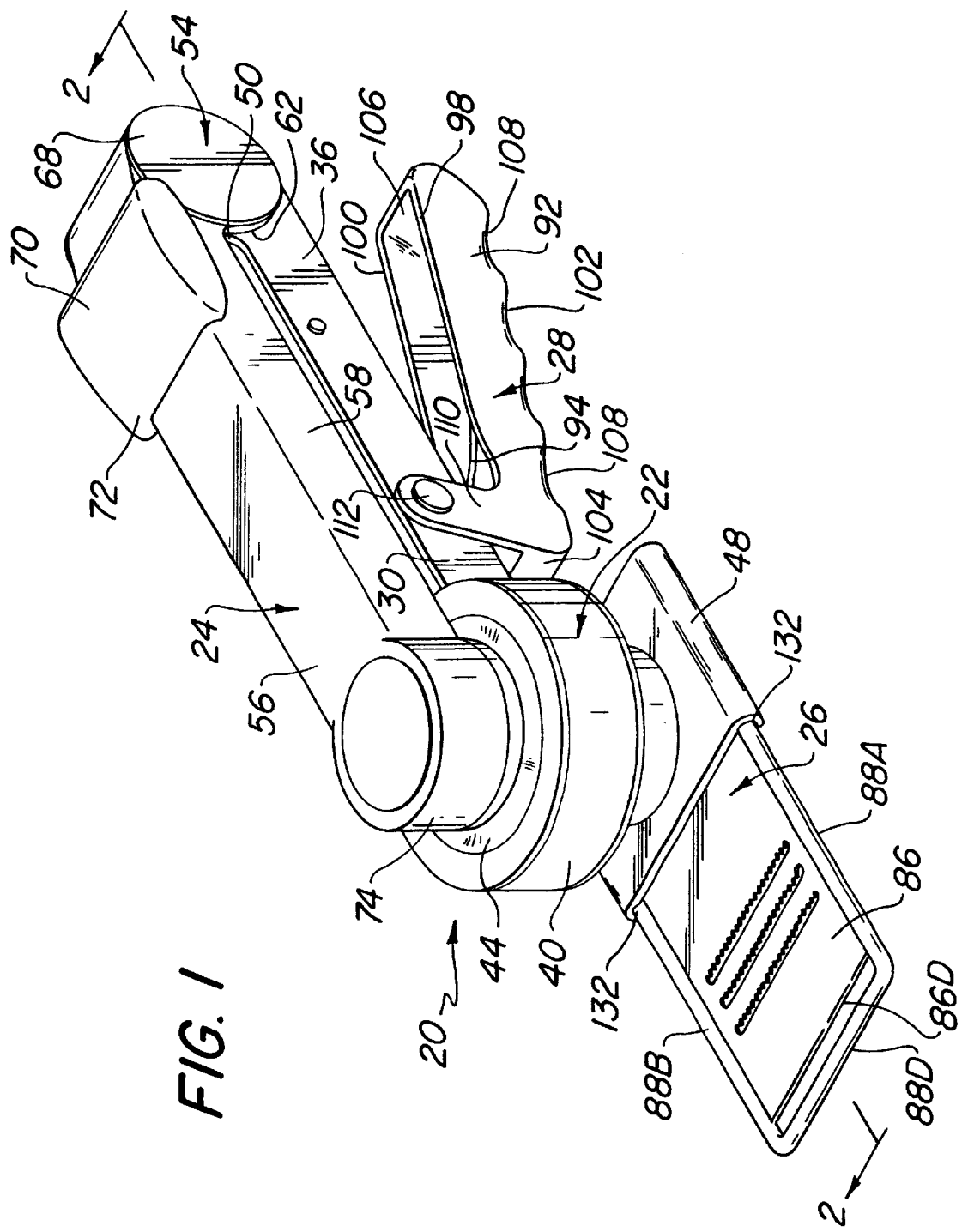
FIG. 1 is an isometric view of one exemplary food processor device constructed in accordance with the subject invention, with the cutting member mounted thereon in an orientation for effecting the slicing of a foodstuff, but without the foodstuff being shown.

Referring now to the various figures of the drawing wherein like reference characters refer to like parts, there is shown at 20 in FIG. 1 a hand-held food processor device constructed in accordance with this invention. The device is arranged to slice, grate or otherwise cut off portions from any foodstuff (e.g., garlic, cheese, meat, nuts, fruits, vegetables, etc.) 10 (FIGS. 5 and 6) that can be cut. As will be described in detail in the discussion to follow, the exemplary embodiment of the food processor device 20 is a relatively small and compact unit that includes a cutting member which is arranged to be releasably mounted on the device in a selected orientation to enable the device to either slice or grate the foodstuff. Depending upon the shape and configuration of the cutting member, the device can slice the foodstuff into one or more relatively thin slices or slabs, or can "grate" the foodstuff into plural smaller pieces, e.g., small particles, thin elongated strips, such as julienne strips, or other small pieces. In the interest of brevity, when discussing the subject device the term "slice" (or variants of that word) will be used to denote the formation of a single cutting or piece from the food stuff upon a single movement or "pass" of the cutting member of the device across the foodstuff, whereas the term "grate" (or variants of that word) will be used to denote the formation of plural cuttings from the foodstuff upon a single movement or pass of the cutting member across the foodstuff. However, it must be appreciated that the cutting member can be constructed to produce plural slices on a single pass, so that the terms slice and grate can overlap to some degree. What is significant about one aspect of this invention is the ability of the device to perform at least two different types of cuts depending upon the orientation of its orientable cutting member. However, even that feature is not mandatory. Thus, a food processing device can be constructed in accordance with this invention for accomplishing only a single type of cutting. Moreover, whether or not the device includes a cutting member capable of effecting two different types of cuts, the device can be readily held in one hand of a user, so that the user can squeeze portions of the device with that hand to expeditiously effect the slicing or grating operation.

Figure 2:
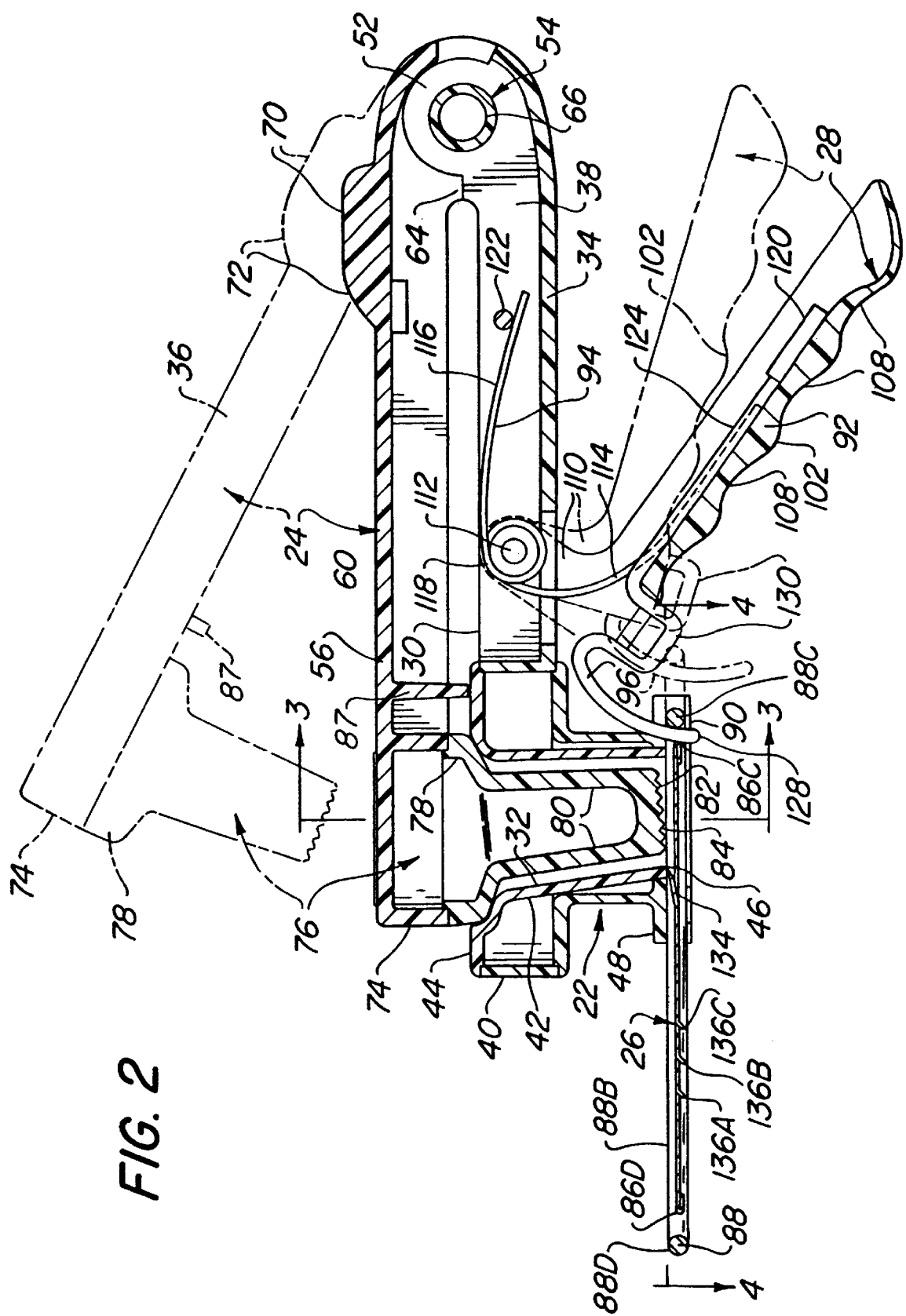
FIG. 2 is a slightly enlarged partial sectional view taken along line 2—2 of FIG. 1.

As best seen in FIGS. 1, 3, 5 and 6 the hand-held food processor device 20 basically comprises a receptacle member 22, a pusher member 24, a cutting member 26 and an actuator 28. The receptacle member 22 is in the form of an elongated handle-like body portion 30 terminating in a cavity 32 at its free end. The receptacle member 22 is preferably molded of any suitable plastic material, but may be metal, and is of a generally channel-like shape having a bottom wall 34 and a pair of sidewalls 36 (FIG. 1) and 38 (FIG. 2). The cavity 32 is in the form of a hollow annulus (see FIG. 2) having a generally circular outer sidewall 40 which is integral with the free end of the channel-shaped handle portion 30. The annulus includes an inner wall 42 spaced from the outer wall 40 by a generally planar top wall 44. The inner wall and top wall may be a one-piece member fixedly secured to the hollow outer wall 40. That wall may itself be a two piece member whose pieces are fixedly secured to each other as shown in FIG. 2. The bottom of the inner wall 42 forming the cavity is open to form an outlet 46 (FIGS. 2, 3, 5 and 6). A flange 48 projects outward from the bottom of the cavity contiguous with the outlet 46. The flanges serve to releasably mount the cutting member 26 to enable it to reciprocate across the outlet upon the operation of the actuator 28 and also enables the cutting member 26 to be held in them for such reciprocation in one of two orientations, to effect either slicing or grating (as will be described later).

The opposite end of the channel-shaped handle portion 30 of the receptacle member includes a pair of upstanding flanges 50 and 52 projecting upward from the sidewalls 36 and 38, respectively. These flanges are spaced slightly further apart than the flanges of the receptacle member and each includes a hole, which is arranged to receive a pivot pin 54. The pivot pin 54, will be described later. Suffice for now to state that it serves to pivotably mount the pusher member 24 to the receptacle member 22.

Figure 3:
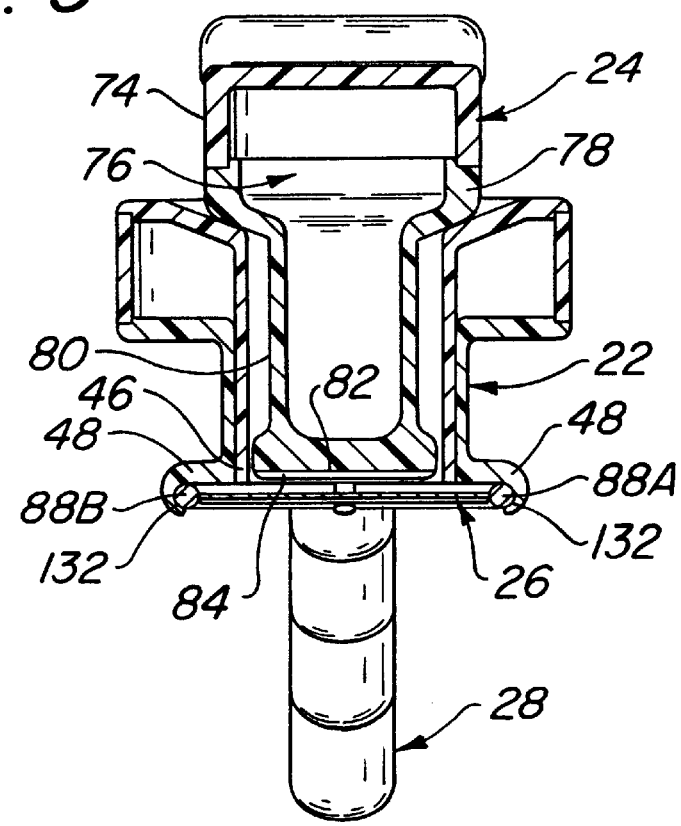
FIG. 3 is a sectional view taken along line 3—3 of FIG. 2.

The pusher member 24 is preferably molded of any suitable plastic material (like the that of the receptacle member), but may be metal, and is of a generally channel-like shape having a top wall 56 and a pair of sidewalls and 58 (FIG. 1) and 60 (FIG. 3). The sidewalls 58 and 60 at one end of the channel-like pusher member terminate in a pair of upstanding flanges 62 (FIG. 1) and 64 (FIG. 2). These flanges each include a hole, which is arranged to receive the pivot pin 54 to pivotably connect the pusher member 24 to the receptacle member 22. As can be seen in FIG. 2 the pivot pin 54 includes a hollow cylindrical body 66 having a pair of caps 68 at the ends of the body. The flanges 50 and 52 of the receptacle member 22 are located between the flanges 62 and 64 of the pusher member 24 so that their holes are axially aligned. The cylindrical body 66 of the pivot pin extends through the aligned holes, while the caps 68 of the pin engage the outer surfaces of the flanges 62 and 64, respectively, to pivotably connect the pusher member 24 to the receptacle member 22. The top surface or wall 56 of the pusher member includes an enlarged surface area or palm pad 70 having an arched front surface 72 located closely adjacent the pivot pin 54 for reasons to be described later.

The opposite end of the pusher member 24 is in the form of an annular wall 74 (FIGS. 2 and 3) in which an off-set pusher element 76 is mounted. The off-set pusher element 76 includes a circular sidewall 78 which tapers downward in the form of a hollow or tubular free-end section 80. The lower end of the free-end section is in the form generally planar flanged wall 82, whose outer surface is textured, e.g., includes plural serrations or ridges 84. The outer profile of the tubular free end section 82 of the pusher member is shaped to readily enter the top of the cavity 32 and to fit somewhat closely therein as best seen in FIGS. 2 and 3. A projection or stop 87 (FIG. 2) extends downward from the undersurface of the top wall 56 of the pusher member to engage the annular top wall 44 of the receptacle. This feature prevents the pusher's off-set end portion 76 from extending too deeply into the cavity 32, i.e., extending to the point at which its serrated end wall 84 is disposed outside the outlet 46 of the cavity, since such action could damage that end of the pusher if the cutting member (to be described later) were to engage it.

The cutting member 26 is arranged to be drawn or pulled from an extended or neutral position across the portion of the foodstuff 10 forced out of the outlet 46 of the cavity 32 by the operation of the actuator 28 (to be described later) to either slice or grate that portion of the foodstuff. The details of the cutting member will be described shortly. Suffice it for now to state that the cutting member 26 is arranged be releasably mounted on the device by the flanges 48 in either one of two orientations adjacent the outlet so that it can either slice or grate the foodstuff. In particular, when the cutting member is in its first orientation, e.g., one face of it faces the outlet 46, it acts as a slicer on each pass or operation to cut a slice or slab of the foodstuff from the portion of the foodstuff that is pushed out of the outlet. When in the second orientation, e.g., its opposite face faces the outlet, the cutting member acts as a grater to grate plural small pieces of the foodstuff from the portion of the foodstuff that is pushed outside of the outlet on each pass of the cutting member. To those ends in the exemplary embodiment shown the cutting member 26 is arranged be dismounted from the device, reoriented, e.g., flipped over (as will be described later) and remounted so that when operated it effects either cutting or grating, depending upon the orientation of the cutting member. It should be pointed out at this juncture that the cutting member can be reorientable so that the same face is always directed towards the outlet, but the cutting member may be rotated 180 degrees to bring particular cutting element(s) to a position where it (they) can be pulled across the outlet to effect either slicing or grating. Moreover, as mentioned earlier the cutting member need not even be reorientable if only a single type of cutting action is to be provided by the device 20. In any case it is desirable that the cutting member 26 be removably mountable on the device 20 to enable it to be taken off for cleaning and/or maintenance or to enable a different type of cutter member to be mounted on the device.

Figure 4:
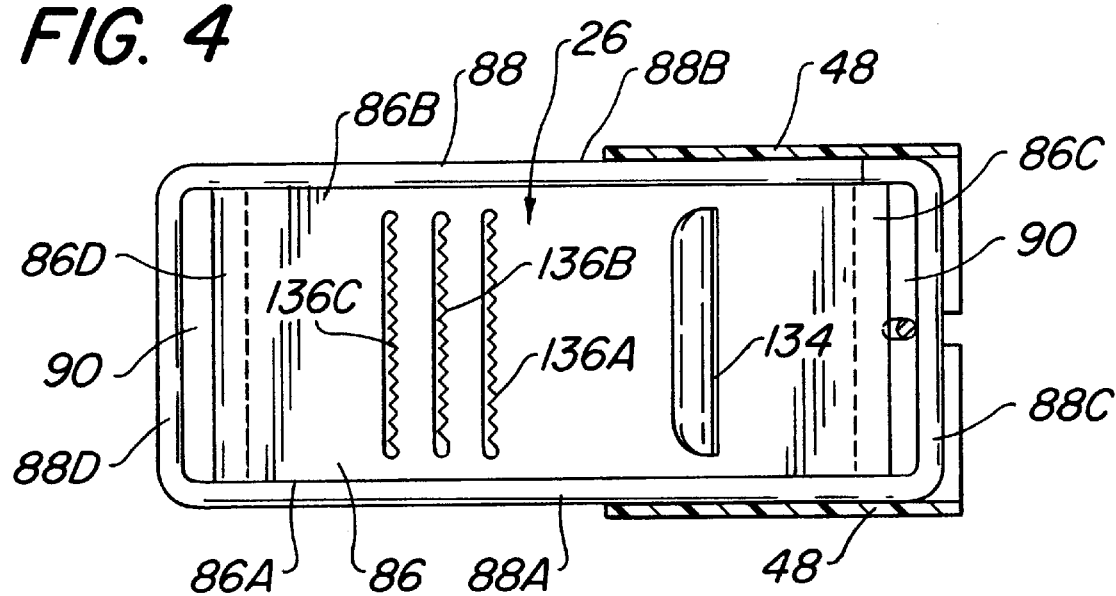
FIG. 4 is a sectional view taken along line 4—4 of FIG. 2.

In the exemplary embodiment shown, the cutting member 26 basically comprises a thin planar panel 86 of metal, e.g., stainless-steel, or some other hard material which can take a sharp edge. The panel 86 is of generally rectangular shape and having a pair of long sides 86A and 86B and a pair of ends 86C and 86D. The ends are folded over to reinforce them for reasons to become apparent later. A generally rectangular reinforcing frame 88 extends about the periphery of the panel. The long sides 88A and 88B of the frame are secured to the two long sides 86A and 86B of the panel 86 by any conventional technique. The end portions 88C and 88D of the frame are spaced slightly from th ends 86C and 86D, respectively, of the panel to create respective enclosed openings 90 therebetween as best seen in FIG. 4. Each enclosed opening 90 is arranged to receive a portion of the actuator 28 (to be described later) to effect the reciprocation of the cutting member depending upon the orientation of the cutting member.

The actuator 28 includes a lever 92, a biasing spring 94, and a latch member 96. The lever is a channel shaped member having a pair of sidewalls 98 and 100, a bottom wall 102, a front end wall 104 and a rear end wall 106. The bottom wall 102 includes plural finger-receiving grooves 108. A pair of flanges 110 project upward from the sidewalls 98 and 100 adjacent the front end wall 104. A pivot pin 112 extends through a pair of aligned holes in the flanges 110 and through a pair of aligned openings in the sidewalls 36 and 38 of the receptacle member 22 to pivotably connect the lever 92 to the receptacle member 22.

Figure 5:
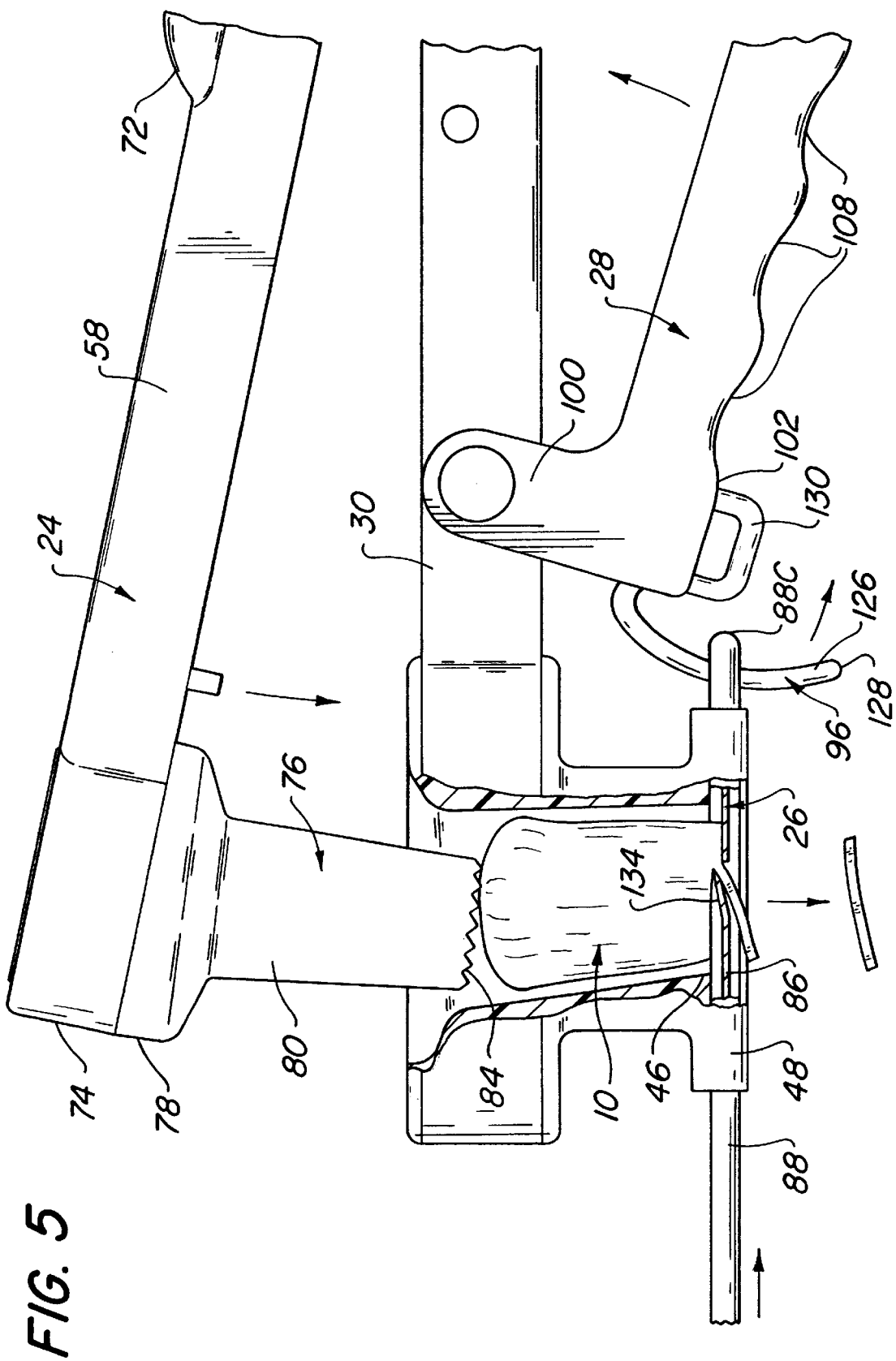
FIG. 5 is a slightly enlarged partial sectional view, similar to FIG. 2, but showing the slicing of a foodstuff, e.g., a piece of cheese, by the food processor device of FIG. 1.

The lever 94 is arranged to be biased into its extended or neutral position, like that shown by the solid lines in FIGS. 1, 2 and 5, by the spring 94. As best seen in FIG. 2, the spring 94 includes a pair of ends 114 and 116 and helically wound intermediate portion 118. The end 114 engages the inner surface of the bottom wall 102 of the actuator lever 92 and is held within a groove therein. The end 116 of the spring 94 engages a stop pin 122 extending between the sidewalls 36 and 38 of the receptacle member to bias the lever to the neutral position. The helical section 118 of the spring extends around the pivot pin 112.

The latch 96 is a generally rod-like member having a linear ear end section 124 disposed within a longitudinally extending groove in the inner surface of the bottom wall of the lever actuator 92. The bottom end of the rear end section is somewhat flattened to form a tang or opposed pair of tabs (not shown) that is disposed generally parallel to the inner surface of the bottom wall of the lever actuator 92 and located within an upstanding block 120 (FIG. 2) to prevent the latch 96 from rotating in the groove. The front end of the latch 96 is an arcuate section 126 extending generally perpendicularly to the rear end section 124 and having a rounded free end 128. A generally rectangular U-shaped intermediate section 130 is located between the front section 126 and the rear section 124. The intermediate section 130 extends through a slot 132 in the actuator lever bottom wall 102 immediately adjacent the front end wall 104 to hold the latch in place. The slot 132 also serves to prevent the latch from rotating about the longitudinal axis of the latch's rear section 124. The portion 130 of the latch extending through the slot 132 forms a "trigger" like member arranged to be pressed by the user to enable the latch to engage or disengage the cutting member 26 as will be described hereinafter. To that end, the latch's free end 128 is arranged to be located within space 90 at the end 86C of the cutting member 26 or within the space 90 at the opposite end 86C of the cutter member (depending upon the orientation of that member) to couple the lever 92 to the cutting member to reciprocate the cutting member across the outlet 46 when the lever 92 is pivoted. To facilitate the latching action the material making up the latch, e.g., a metal, is somewhat flexible. This feature enables the user of the device to press on the intermediate portion 130 of the latch extending out of the slot 130 to cause the front end 126 of the latch to flex upward so that its free end 128 exits the opening 90 in the cutting member. The rounded free end 128 of the section 126 facilitates this action. Thus the cutting member can be readily removed from the device for reorientation, cleaning or replacement.

As mentioned earlier the cutter member is arranged to be releasably mounted over the outlet by the heretofore mentioned flanges 48. In particular, each of the receptacle's flanges includes a track 132 (FIG. 3) extending along the length of the flange. Each track is arranged to receive a respective side rail 88A or 88B of the cutting member's frame 88. Accordingly, the cutter member 26 can slide or reciprocate back and forth across the cavity's outlet, supported and guided by the tracks 132 in the flanges 48. In the embodiment of the cutting member 26 shown in FIGS. 1–6, the panel 86 forming the cutter member includes a slicing blade 134 (FIGS. 2, 4 and 5) in the form of an angularly extending planar portion having a sharp linear free edge that extends transversely across the panel 86. The angled planar blade 134 can be formed by stamping the material of the panel so that it extends at an angle up from the plane of the panel 86. The edge of the offset portion can be a sharped edge of the material making up the panel or another thin strip. In any case the cutter member's panel 86 is arranged to be oriented in a first orientation so that its slicing blade 134 faces upward toward the cavity's outlet 46 and mounted in that orientation on the device 20 by extending its side rails 88A and 88B within the tracks 134 in the flanges 48. When so mounted the cutting member will effect the slicing of the foodstuff when the device is operated, e.g., the cutting member retracted from the neutral position by squeezing on the actuator lever 92. It should be understood that this embodiment of a slicing blade is merely exemplary of various types of slicing blades that can be used with this invention.

As best seen in FIGS. 1, 2 and 4 the panel 86 forming the cutting member also includes three grater blades 136A, 136B and 163C. Each is in the form of a transverse serrated slot whose teeth 138 extend downward from the plane of the panel 86 (i.e., they extend from the opposite face of the panel 86 from which the slicing blade 134 extends, as best seen in FIG. 2). This arrangement is merely exemplary of various types of grater blades that can be used with this invention.

The cutting member 26 is arranged to be removed from the flanges of the device and reoriented so that its angled serrated grater blades 136A, 136B and 136C face upward towards the cavity's outlet 46 and then re-mounted on the device in that orientation by extending the cutting members side rails 88A and 88B within the tracks 132 in the flanges 48. When so mounted the serrated edges will face the cavity's outlet to effect the grating of the foodstuff when the device is operated.

As will be appreciated by those skilled in the art, the biasing spring 94 biases the lever 92 in the neutral or extended position so that the latch 96 pushes the cutting member to the extended or neutral position shown in FIG. 2, wherein the panel's cutting blade 134 is located immediately in front of the cavity's outlet 46, when the cutting member is in the first orientation (i.e., the blade 134 facing upward). When the cutting member 26 is in the second orientation (i.e., the blades 136A, 136B and 136C facing upward) the spring 92 and associated latch 96 biases the lever and also pushes the cutter member to the neutral or extended position, wherein the serrated grater blade 136A is located immediately in front of the cavity's outlet.

The device 20 is arranged to be held within a user's hand with the user's palm being located on the top surface of the pusher member's top wall and resting on the pad 70 and with the user's thumb extending into engagement with the free end of the pusher at the top wall. The pad 70 on the top surface of the pusher serves to provide a comfortable wide area surface for the user's palm to engage and to prevent slippage. The user's fingers are extended around the device to engage the finger-receiving recesses 108 of the actuator lever 92. Thus, by squeezing or pressing the pusher member, the pusher member's off-set end 76 moves into the cavity 32. This action pushes the foodstuff in the cavity downward so that the lowermost portion of that foodstuff passes through and out of the cavity outlet 46. The user then squeezes the actuator lever 92. This action overcomes the bias of the spring 94 to pivot the lever to the retracted position shown in full in FIG. 5 and in phantom lines in FIG. 2, whereupon the free end 128 of the actuator 96 engages the inner peripheral portion of the reinforcing frame portion 88C to pull the cutting member to the rear. Thus, the slicing blade 134 is drawn across the outlet 46 to slice the portion of the foodstuff that is extended out of the outlet. The piece of foodstuff that is sliced by the operation as just described is shown clearly in FIG. 5 and designated by the reference number 10A. The grating of the foodstuff is accomplished in the same manner, except that each serrated edge 136A, 136B and 136C passes through the extending portion of the foodstuff to grate pieces 10B and 10C during a single squeeze of the actuation lever (as shown in FIG. 6).

As should be appreciated by those skilled in the art the arcuate or cam shape of the section 126 of the actuator 96 serves to facilitate the travel of the cutter member (i.e., the distance needed for a complete pass of the slicing or grating blade(s) across the retaining receptacle's outlet) as well as enabling that action to be accomplished with a minimal amount of squeezing force to be applied by the user.

The actuator lever 92 is arranged to be automatically carried back to its neutral or extended position after the cut has been made through the foodstuff, thereby automatically carrying the cutting member 26 back to the neutral or extended position upon the release of the actuator lever by the user. In particular, the release of the actuator lever causes the spring to pivot the lever downward. This action causes the outer surface of the latch contiguous with the free end 128 to push against the reinforced or folded over edge 86C of the cutting member 26. This action automatically pushes the cutter member back to its neutral or extended position. It is now ready to make the next pass to effect further slicing of the foodstuff when the user re-squeezes the actuator lever.

In FIG. 7 there is shown an alternative embodiment of a cutting member 226. The member 226 is in all respects similar to cutting member 26 except that its grater blades comprise two rows of plural offset triangular or conical shaped inclined cutters 228. Moreover in this embodiment the cutters project upward from the same face of the panel 26 as does the slicing blade 134 (not shown in FIG. 7). However, the cutting edges of the cutters 228 face in the opposite direction than the cutting edge of slicer blade 134, i.e., the cutting edges of the cutters 228 face towards the panel end 86D whereas the cutting edge of the blade 134 faces towards the panel end 86C. Thus when it is desired to bring either the slicing blade or the grater blades into use, the cutter member 226 need not be flipped over (as is the case with cutter member 26) but only rotated so that the desired cutting edge(s) face toward the outlet 46.

In FIG. 8 there is shown another alternative embodiment of a cutting member 326. The member 326 is in all respects similar to cutting member 226 except that the grater blades comprise plural offset rectangular shaped inclined cutters 328. These cutters are useful to produce "julienne" type grated foodstuffs.

Without further elaboration the foregoing will so fully illustrate my invention that others may, by applying current or future knowledge, adopt the same for use under various conditions of service.

I claim:

1. A hand-held food processor device for selectively slicing or grating a foodstuff, said food processor device comprising a receptacle member having a hollow cavity for receipt of the foodstuff, a pusher member for engaging the foodstuff to move the foodstuff, a cutting member for slicing or grating the foodstuff and an actuator for operating said cutting member, said receptacle member comprising a body portion having a first end and a second end, said hollow cavity being located at said second end and having a outlet, said cutting member being movably mounted adjacent said outlet, said pusher member having a first end pivotably connected to said first end of said receptacle member and a second end for engaging the foodstuff within said cavity to push a portion of the foodstuff out of said outlet, said actuator being arranged to cause said cutting member to move across said outlet into engagement with the portion of the foodstuff to slice or grate the portion of the foodstuff.

2. The hand-held food processor device of claim 1 wherein said cutting member includes at least a first portion arranged to be selectively oriented in a first orientation with respect to said device for effecting the cutting of the foodstuff, and at least a second portion of arranged to be selectively oriented in a second orientation with respect to said device for effecting the grating of the foodstuff.

3. The hand-held food processor device of claim 2 wherein said cutting member is releasably mountable on said device in one of said first and second orientations.

4. The hand-held food processor device of claim 3 wherein said actuator comprises a pivotable lever and wherein said cutter member is arranged to be reciprocated across said outlet by the operation of said lever.

5. The hand-held food processor of claim 4 wherein said pusher member and said receptacle member are each elongated members and wherein said pusher member is arranged to push the foodstuff towards said outlet and said lever is arranged to be pivoted to move said cutter member in a first direction across said outlet when said food processor is squeezed in the hand of the user to slice or grate the portion of the foodstuff exiting said outlet.

6. The hand-held food processor of claim 5 wherein said actuator is spring biased and wherein release of the actuator by the user enables said spring to pivot said lever to a position, whereupon said cutter member is moved in a second and opposite direction to said first direction across said outlet, to enable reuse of the device for another slicing or grating operation.

7. The hand-held food processor of claim 3 wherein said cutting member comprises at least one slicing blade and at least one grating blade, and wherein said cutting member is arranged to be releasably mounted on said device in said first or second orientations to enable either said at least one slicing blade or said at least one grating blade to engage the foodstuff forced out of said outlet.

8. The hand-held food processor of claim 7 wherein said device includes a pair of tracks mounted adjacent said outlet and wherein said cutting member comprises a generally planar panel having a pair of side rails for enabling said cutting member to be releasably mounted in said tracks in either one of two orientations.

9. The hand-held food processor of claim 8 wherein said at least one slicing blade extends in a first direction from said generally planar panel and wherein said at least one grating blade extends in a second direction from said generally planar panel, said generally planar panel being arranged to be selectively oriented and mounted on said device in a first orientation, whereupon said at least one slicing blade faces said outlet or in a second orientation whereupon said at least one grating blade faces said outlet.

10. The hand-held food processor of claim 7 wherein said at least one slicing blade comprises a generally planar shaped blade having a cutting edge spaced from said panel.

11. The hand-held food processor of claim 7 wherein said at least one grating blade comprises a blade having a serrated cutting edge spaced from said panel.

12. The hand-held food processor device of claim 1 wherein said body portion of said receptacle member is elongated.

13. The hand-held food processor device of claim 12 wherein said pusher member is elongated.

14. The hand-held food processor device of claim 1 wherein said actuator comprises a pivotable lever.

15. The hand-held food processor device of claim 14 wherein said cutter member comprises a generally flat member arranged to be reciprocated across said outlet by the operation by the pivoting of said lever.

16. The hand-held food processor of claim 1 wherein said actuator is spring biased.

17. The hand-held food processor of claim 1 wherein said pusher member comprises a textured surface to firmly engage the foodstuff to prevent slippage therebetween.

* * * * *